United States Patent
Rosen

(10) Patent No.: US 6,902,117 B1
(45) Date of Patent: Jun. 7, 2005

(54) WIRELESS TRANSMISSION OF TEMPERATURE DETERMINING SIGNALS TO A PROGRAMMABLE THERMOSTAT

(76) Inventor: Howard Rosen, 5756 Royalmount Avenue, Montreal, Quebec (CA) H4P 1K5

( * ) Notice: Subject to any disclaimer, the term of this patent is extended or adjusted under 35 U.S.C. 154(b) by 0 days.

(21) Appl. No.: 10/420,660

(22) Filed: Apr. 21, 2003

(51) Int. Cl.$^7$ .............................................. G05D 23/00
(52) U.S. Cl. ........................ 236/51; 236/46 R; 340/586
(58) Field of Search ........................ 236/51, 1 B, 46 R, 236/46 F; 340/584, 586, 595, 599

(56) References Cited

U.S. PATENT DOCUMENTS

| 4,391,913 A | | 7/1983 | Keldmann |
|---|---|---|---|
| 4,734,871 A | * | 3/1988 | Tsunoda et al. ............ 700/300 |
| 5,413,278 A | * | 5/1995 | Erikson ...................... 236/49.3 |
| 5,927,599 A | | 7/1999 | Kath |
| 6,513,723 B1 | | 2/2003 | Mueller et al. |

* cited by examiner

*Primary Examiner*—Harry B. Tanner
(74) *Attorney, Agent, or Firm*—David T. Bracken

(57) ABSTRACT

The present invention includes systems and methods using a wireless sensor for wirelessly transmitting a temperature signal to a programmable thermostat without intervening digital storage. A temperature circuit comprises a temperature sensor whose resistance changes with temperature and one or more reactive components. The temperature is inferred at the receiver from the time elapsed between reception of the various coded pulses that indicate activity within the transmitter.

8 Claims, 2 Drawing Sheets

WIRELESS TRANSMISSION OF TEMPERATURE DETERMINING SIGNALS TO A PROGRAMMABLE THERMOSTAT

BACKGROUND OF THE INVENTION

The present invention relates to programmable thermostats, especially where remote and wireless temperature sensors sense a temperature to be wirelessly transmitted to a programmable thermostat.

The prior art describes many programmable thermostats. Many of the advances in making microcomputers smaller and less expensive have shown up in programmable thermostats. For a relatively small price, a programmable thermostat may operate several pieces of HVAC equipment, such as air flow fans, heat pumps and the fans associated with their heat transfer surfaces, air conditioning compressors and the fans associated with their refrigerant coils, and heaters and the fans associated with their heat transfer surfaces. Programmable thermostats have also been adapted to receive inputs of temperature, humidity, gas concentrations, light detection, motion detection, and several other indicators of a room's condition.

The location of environmental sensors have been expanded by moving them into wireless sensor devices. The wireless sensor devices comprise an environmental sensor and a wireless transmitter, along with logic means where the sensor input is stored for wireless transmission to a programmable thermostat. In one example, prior art devices comprise a system where a thermistor senses a temperature, the thermistor response is stored in a microcomputer register as digital data, whereupon the digital data is manipulated to indicate a temperature value. The digital temperature value is converted to an analog wave form which is wirelessly transmitted to a receiver effectively connected with a programmable thermostat. The reception of the analog temperature value is converted to a digital temperature value and stored and/or acted upon by the programmable thermostat. This system further comprises a wireless sensor that can be placed outdoors to sense an outside temperature or can be placed in other remote locations where a wired connection would be inconvenient or too expensive. A battery powered wireless sensor is used in those locations. When using a battery powered wireless transmitter, special care must be made in the overall design to minimize power consumption so the device may operate for a long time without battery replacement.

There is a need for a system where temperature sensing means such as a thermistor can more directly and wirelessly transmit a temperature signal to a programmable thermostat without intervening digital storage.

SUMMARY OF THE INVENTION

The present invention includes systems and methods using a wireless sensor for wirelessly transmitting a temperature signal to a programmable thermostat without intervening digital storage. A temperature circuit comprises a temperature sensor whose resistance changes with temperature and one or more reactive components.

The output of the temperature circuit is a wave, pulse or other time varying response whose aspects can be used to determine the temperature at the temperature sensor.

In a first embodiment, the temperature circuit comprises the temperature sensor and one or more capacitors to form an oscillator whose output frequency changes with the resistance value of the temperature sensor. Preferably a low voltage DC input to the oscillator may be continuous or periodic to preserve battery power that preferably powers the controlled by a timed switch, output signal comparator, microcomputer or similar controller. The output from the temperature circuit is delivered to a wireless transmitter. The wireless transmitter sends a signal whose frequency varies with temperature to a receiver connected with a programmable thermostat. The programmable thermostat converts the received temperature into digital data indicating the temperature sensed at the wireless sensor. The digital data is then stored in registers available for use by one or more of the programs or for presentation on a display screen of the programmable thermostat.

In a second embodiment, the temperature circuit comprises a resistive temperature sensor and one or more reactance devices. An input to the temperature circuit results in an output for which a time constant or similar charge or discharge response ("temperature time response" herein) is directly or indirectly measurable.

For the second embodiment, the temperature time response varies with resistance of the resistive temperature sensor. Information about the temperature time response is directly or indirectly obtained, transmitted to the environmental control device and translated there into a temperature sensed at the resistive temperature sensor.

Information about the temperature time response can be used alone to calculate a temperature value. Alternately, information about the temperature time response can be compared with time response information for a reference circuit within the circuitry of the wireless sensor. The reference circuit includes one or more of the reactance devices of the temperature circuit. A calculation comparing the time responses of the temperature circuit and the reference circuit can then determine a temperature value at the temperature sensor.

In a simple example, the temperature circuit comprises the resistive temperature sensor connected with one or more capacitors. The temperature time response of this circuit results from charging or discharging the capacitor(s). The information obtained about this temperature time response can later be translated to a sensed temperature.

The steps required are as follows. The RC temperature circuit is charged by a reference voltage or is discharged by discharging one or more of from one or more of the circuit capacitors. The output of the RC temperature circuit in response to the charging or discharging is the temperature time response. Information about the temperature time response is wirelessly transmitted to the environmental control device to be translated to a temperature value. In the alternate form described above, information about the time response of the reference circuit is also wirelessly transmitted to the environmental control device.

It isn't necessary to store any information about the temperature time response in the wireless sensor, which is a remote device to the environmental control device. This is a critical advantage of the invention system over the prior art. One method for achieving the non-storage transmission is by using coded pulse sequences. The pulse sequences indicate the occurrence of a condition in the temperature time response, such as a predetermined output voltage level or a predetermined time. The pulse sequences can be translated at the environmental control device to determine the time response of the temperature circuit, and, if included, the reference circuit. In a less preferred form of the invention, information about the time responses and/or circuit elements in the temperature circuit may be stored in the wireless sensor.

For example, output voltage is obtained at a start time and after the passage of a predetermined time period. A coded pulse sequence is transmitted indicating the output voltage at the start time. Another coded pulse sequence is transmitted indicating the output voltage at the end of the predetermined time period. Because the circuit element values and the length of the predetermined time are stored in the environmental control device, that device can calculate a temperature sensed at the temperature sensor.

Alternately, a start time is obtained when the output voltage reaches a predetermined first voltage. An end time is obtained when the output voltage reaches a predetermined second voltage. A coded pulse sequence is transmitted indicating the start time. Another coded pulse sequence is transmitted indicating the end time. Because the circuit element values and the first and second voltages are stored in the environmental control device, that device can calculate a temperature sensed at the temperature sensor.

For the second embodiment, a wireless transmitter is part of the wireless sensor. The wireless transmitter receives signals from the temperature circuit and wirelessly transmits them as temperature signals to a receiver connected with a programmable thermostat. The programmable thermostat converts the received temperature signals into digital data. The digital data is then available in registers in one or more of the programs or a display of the programmable thermostat.

In another simple example of the second embodiment, the resistive temperature sensor (R1) and a reference resistor (R2) are both connected to a capacitance (C1). A charge and/or discharge time response is generated for each combination of R1/C1 and R2/C2 for comparison after wireless transmission to an environmental control device. The comparison reduces the need for a more carefully constructed and expensive measuring device since the ratio of the two resistive elements (meaning the sensor element and the reference resistor) can be accurately determined even if all other circuit elements suffer from large, even unpredictable long or medium term variations.

DETAILED DESCRIPTION OF THE INVENTION

The invention is now discussed with reference to the figures.

First Form of the Invention—Periodic Wave Type

Figure 1:
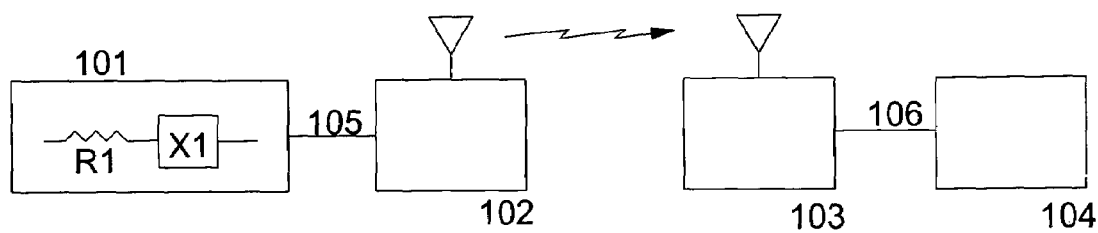
FIG. 1 is a block diagram of the invention system.

As described above, the first embodiment comprises a temperature circuit FIG. 1 shows temperature response means 101, transmission means 102, environmental control means 103, and environmental control equipment operating together in the invention system. Means 101 is a circuit that receives a reference voltage or current input. This input produces first temperature signals that are sent to transmission means 102 by connection 105. Connection 105 comprises one or more connections between means 101 and 102 so that means 102 may control application of reference voltages or currents.

Means 102 further processes the first temperature signals to form second temperature signals that are wirelessly transmitted to environmental control means 103. Means 103 wirelessly receives the second temperature signals and converts those signals to an actual temperature value of the ambient temperature at means 101, which value is stored in means 103. Means 103 can retrieve the temperature value for display or for use in the functions of means 103 for programmably controlling environmental control equipment 104 via connections 106.

Means 101 comprises resistive temperature sensor R1 connected in serial or parallel with reactance means X1. Sensor R1 and means X1 receive an input of a reference voltage or current to produce the first temperature signals. In some manner, at least one aspect of the output responses of sensor R1 and means X1 are measurable at means 103 so that the aspect's absolute value or comparison to a reference value can be translated by means 103 to the ambient temperature at sensor R1. The just described measurable aspect of the first temperature signals is at least substantially dependent on the effective resistance value of sensor R1. The first temperature signals are thereby capable of representing the ambient temperature of sensor R1.

In a first form of the invention, a measurable aspect of the first temperature signal is a part of a periodic waveform. Means X1 comprises components required for making means 101 an oscillator. In this oscillator, sensor R1 substantially determines the amplitude, frequency, or phase shift of a wave form of the first temperature signal. The elements of means X1 comprise the circuit of U.S. Pat. No. 6,513,723 in FIG. 5, which disclosure is incorporated herein. It is known that the effective resistance of a thermistor, such as sensor R1 in one form, may operate to determine the frequency of an output signal from that circuit. In contrast to U.S. Pat. No. 6,513,723, the present invention does not store the first temperature signal in any digital or other storage means within means 101 or 102. Means 102 for this form of the invention only adds the first temperature signal to any required carrier for wireless transmission and then wirelessly transmits that second temperature signal to means 103 for translation to an actual temperature value.

An alternate of the first form of the invention counts, for a preset time, the number of times an output signal from means 101 passes through a specific voltage level between the upper and lower amplitudes of a periodic wave of that output signal. This counting will result in a number that can be appropriately divided by the preset time (and number of times the specific voltage level is reached in a period) to determine the frequency of the output signal from means 101. The number of counts are wirelessly transmitted to means 103, where the preset time value has been stored and is used to determine the frequency of the output signal from means 101. The number of counts can be stored in means 102, but the number of counts alone cannot indicate temperature without further calculation in means 103. Thus, means 103 can determine the frequency of an oscillator including the thermistor, the resistance value of the thermistor at the time of the measured portion and the ambient temperature at the thermistor.

Second Form of the Invention—Charge/Discharge Type

In a second form of the invention, sensor R1 and means X1 are charged and/or discharged to provide the first temperature signals. A time response of the charge and/or discharge from the sensor R1 and means X1 provide an absolute value from which temperature can be determined. In this case, the first temperature signals will simply be the transmission of first coded pulse sequences to means 103 at the beginning of the charging interval for capacitor X1 through sensing resistance R1. The second temperature signal will be the transmission of a second coded pulse sequence to means 103 when a predetermined voltage is reached on capacitor X1. Means 103 can then infer the temperature at sensor element R1 from the time elapsed between reception of the first and second coded pulse sequences.

Figure 2:
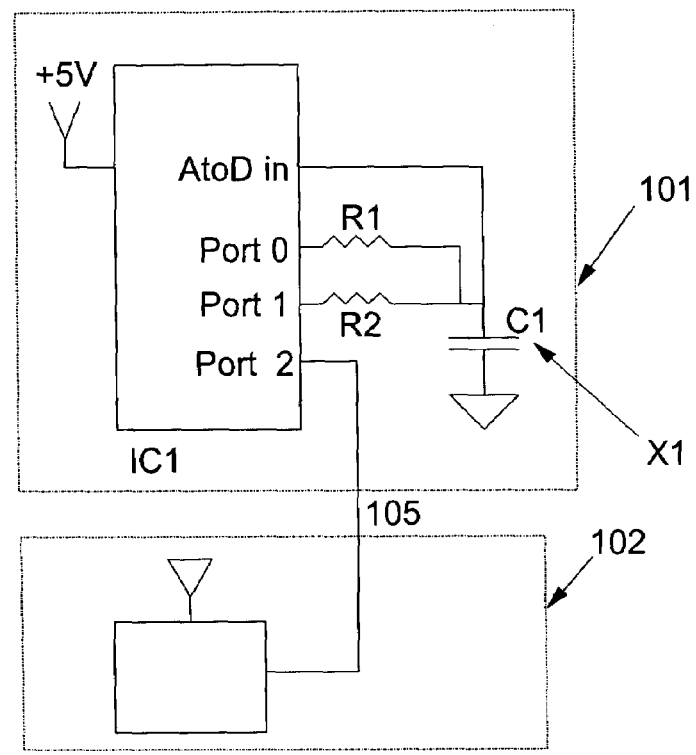
FIG. 2 is a diagram of a charge and/or discharge form of the invention.

FIG. 2 shows another preferred embodiment of the second form of the invention, signals indicating the initiation and termination of the charge or discharge of a capacitor through a resistive sensor are sent to the environmental control device, along with signals indicating the initiation and termination of the charge or discharge of a capacitor through a reference resistor.

Therefore, a circuit using a known reference resistance, R2, and means X1 produce a reference time response to a charge and/or discharge step. The thermistor time response is compared with the reference time response at the environmental control device after wireless transmission to produce the first temperature signal. In a preferred mode of operation, the first temperature signals, without storage in either of means 101 or 102, are transferred to means 102, where the first temperature signals are applied to a wave form for wireless transmission to means 103 for ultimate determination of the temperature at sensor R1. A reference time response comparison with the thermistor time response reduces or eliminates the errors.

It is preferred that means 101 and 102 share a low power source of low voltage batteries for mobility of means 101 and 102. The means 101 and 102 are preferably contained in a single housing made of plastic or other appropriate material with batteries for power. Therefore, it is preferred that the circuit design of means 101 and 102 are made appropriate with conserving power for long term use apart from other power sources. In a preferred embodiment, means 102 comprise a microprocessor that periodically triggers application of a reference voltage to means 101, whereupon a first temperature signals generated and sent to means 102 and then transmitted to means 103.

FIG. 2 shows a specific example of the second embodiment of the invention using a reference resistor R2 with sensor R1 connected between integrated circuit IC1 and capacitor C1. Capacitor C1 is in this example the reactance means X1 for the system. In the invention system, sensor R1 is preferably a thermistor but may be any type of resistive transducer to measure some environmental aspect other than temperature. Integrated circuit IC1 comprises means for receiving a reference voltage, providing inputs to and outputs from sensor R1 and reference resistor R2, and transmitting first temperature signals by connection 105 to means 102. Means 102 preferably comprises means for initiating application of the reference voltage, sensing and for turning it off.

A preferred operation of the device of FIG. 2 is now discussed. A reference voltage is applied by integrated circuit IC1. At that instant or later, say when a predetermined start voltage is reached on the capacitor C1 (sensed in integrated circuit IC1), a first coded pulse sequence is sent to means 102 and then wirelessly to a receiving circuit within means 103, identifying the start of a desired part of the charging interval for capacitor C1. The receiving circuit then starts to measure time or records the start time for the desired part of the charging interval. Means 103 comprises programmable microprocessor, switching and display means for accomplishing the objects of the invention.

A charging time interval passes for the desired part of the charging interval. The charging time interval can be constant or variable depending on system requirements and the objects of the invention. For example, charging may proceed for a predetermined time, or until a predetermined voltage is reached, or a combination of conditions is attained. At the end of the charging time interval, the reference voltage is removed from the sensor R1. A second coded pulse sequence is sent to the receiving circuit to identify the end of the charging time interval. The receiving circuit makes a note of the duration of the charging time interval.

At that instant, or a later, if for some reason this is desired, the capacitor C1 is allowed to discharge through a reference resistor R2. The resistance value of reference resistor R2 is known. The same or another reference voltage (which could even be zero) is applied to reference resistor R2. A third coded pulse sequence is sent to the receiving circuit indicating the start of a desired time interval for discharge of capacitor C1, i.e., a discharging time interval. This third coded pulse sequence is only needed if the discharging time interval is delayed with respect to the end of the charging time interval. If no delay is required to obtain a sufficiently accurate result for the objects of the invention, the second coded pulse sequence may also serve as the third coded pulse sequence as to the operation of the receiving circuit for measuring the discharging time interval. In this way, the same coded pulse sequence may be used to identify the end of charging and the start of discharging capacitor C1. When the discharge operation of capacitor C1 discharges to a predetermined voltage across that element (which could be any reasonable value including zero), a fourth coded pulse sequence is transmitted to the receiving circuit. The receiving circuit interprets the fourth coded pulse sequence to mean that the discharging time interval has ended. The receiving circuit notes the actual time required for the discharging time interval.

The receiving circuit is then able to compare the charging time interval with the discharging time interval. The ratio of the duration of the charging time interval and the discharging time interval, is a mathematical function of the ratio of the resistors involved, one being a known resistor, the other being a function of temperature (or some other variable). It is therefore possible for the receiving circuit to determine the resistance value of an unknown resistance, hence the temperature or other variable from those durations.

If an accurate time reference (meaning a stable frequency source or a common time reference) is available to both the receiving circuit at means 103 and at the transmitting circuits of means 101 and 102 and if the charging time interval is predetermined, it is possible to send only the pulses that identify the beginning and end of the discharging portion of the cycle, since the duration of the charging time interval is then known. The only component that needs to exhibit long term stability with respect to the variable being measured is the reference resistor R2, since all other components affect both the rate of charge and the rate of discharge and therefore cancel out of the equations required for determination of unknown resistance at sensor R1.

For more accuracy, the capacitor C1, sensor R1 and reference resistor R2 may be included in an integrator circuit using an operational amplifier or similar device. This is the preferred implementation, since operational amplifiers (which may or may not be part of the same package) may also be used as comparators in means 101 to determine when the predetermined voltages, alluded to earlier, have been reached.

The FIG. 2 system may operate according to the following or substantially similar steps:

1—Make Port0 HIGH and program Port1 as an input.
2—Wait for voltage on capacitor to reach some value, say 256 (Hex 100).
3—Send a pulse sequence (via Port2) to indicate beginning of charge interval.
4—Wait for voltage on capacitor to reach some value, say 768 (Hex 300).
5—Turn Port0 into input.
6—Send pulse sequence to indicate end of charge and start of discharge.
7—Set Port1 LOW.
8—Wait for voltage to go down to some value, say 256 (Hex 100) again.
9—Send pulse sequence to identify end of discharge interval.
10—Wait a while and start again.

Figure 3:
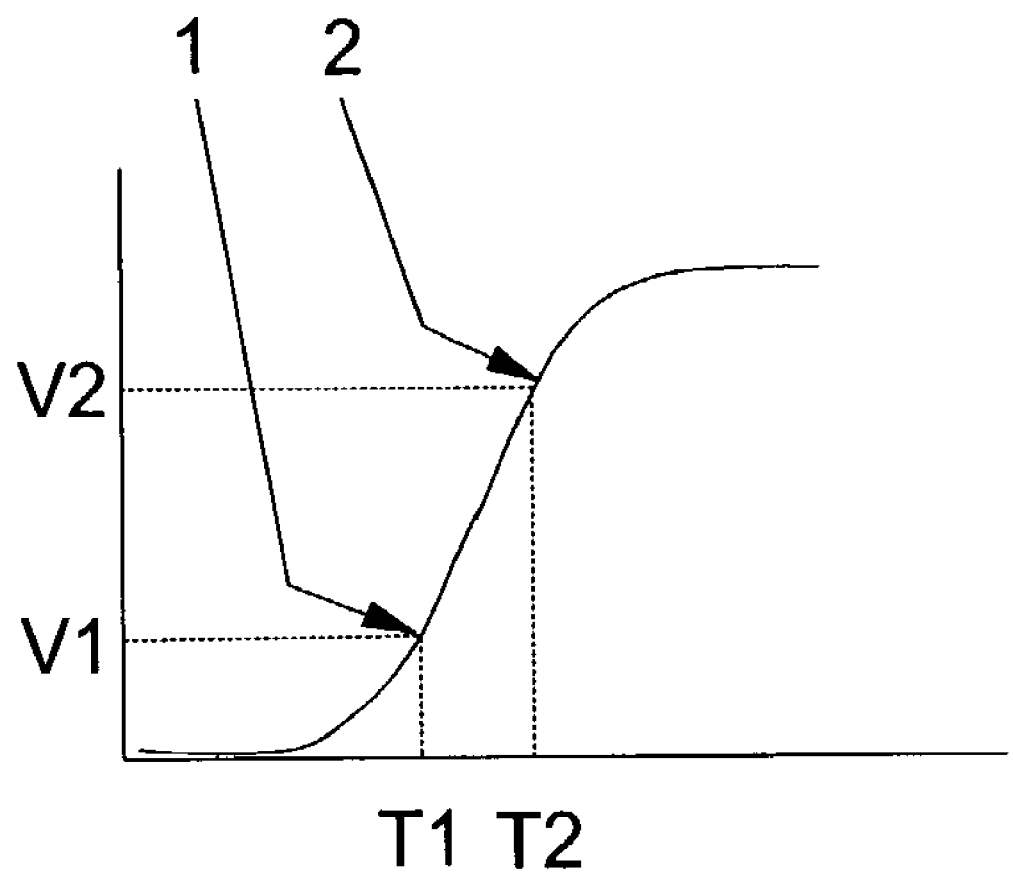
FIG. 3 is a temperature time response of the invention temperature circuit to charging with a reference voltage.

FIG. 3 shows critical steps at points 1 and 2 in the output from a temperature circuit during a charging of that circuit. Voltage V1 at time T1 define one of many points along the time response curve where measurement of a part of a time response may begin. As described above, either voltage V1 or time T1 is wirelessly transmitted as a first coded pulse sequence to means 103. Voltage V2 at time T2 define one of many points along the time response curve where measurement of a part of a time response may end. Also as described above, either voltage V2 or time T2 is wirelessly transmitted as a second coded pulse sequence to means 103.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

What is claimed is:

1. A system for wirelessly transmitting a sensed ambient environmental condition at a resistive sensor whose resistance varies predictably with the environmental condition comprising:
    (a) a programmable environmental control device capable of turning on or off environmental control equipment and which has means for wirelessly receiving signals from a remote unit comprising a temperature response means and a transmitting means;
    (b) the temperature response means comprising the sensor and one or more reactance elements effectively connected with a switchable input reference voltage and a wireless transmission means that receives signals from the temperature response means, where the sensor and reactance element or elements are adapted to output signals from which, at the environmental control device, may be calculated the environmental condition at the sensor;
    (c) applying or turning off a reference voltage to the sensor and reactance element or elements and sending a first temperature signal to the transmitting means;
    (d) forming a second temperature signal from the first transmitting signal in the transmission means;
    (e) without storage of the first temperature signal or second temperature signal respectively in the remote unit, wirelessly transmitting the second temperature signal to the environmental control device;
    (f) the sensor and reactance element or elements are part of a circuit whose time response to charging or discharging indicates the environmental condition;
    (g) a first pulse sequence becomes the first temperature signal upon the occurrence of a first sensed voltage output from the sensor and reactance element or elements; and
    (h) a second pulse sequence, after the first pulse sequence, becomes the second temperature signal upon the occurrence of a second sensed voltage output from the sensor and reactance element or elements or passage of a predetermined time, either of which indicate a charge or discharge of the circuit of the sensor and reactance element or elements.

2. The system of claim 1 wherein a reference resistor is connected between the reference voltage source and the reactance element or elements and the reference voltage is applied to the circuit of the reference resistor and reactance element or elements.

3. The system of claim 2 wherein wherein a third pulse sequence becomes the third temperature signal upon the occurrence of a third sensed voltage output from the reference resistor and reactance element or elements.

4. The system of claim 3 wherein a fourth pulse sequence, after a fourth pulse, becomes a fourth temperature signal upon the occurrence of a third sensed voltage output from the reference resistor and reactance element or elements.

5. The system of claim 4 wherein the environmental control device comprises microcomputer means where the time interval between the first and second pulse sequences is compared with the time interval between the third and fourth pulse sequences to calculate the environmental condition.

6. The system of claim 5 wherein the remote unit is entirely battery powered.

7. The system of claim 6 wherein transmission means comprise means for periodically activating the reference voltage to preserve battery life.

8. The system of claim 6 wherein the environmental condition is temperature.

* * * * *